(12) United States Patent
Milne et al.

(10) Patent No.: US 9,906,897 B2
(45) Date of Patent: Feb. 27, 2018

(54) APPLYING MESH NETWORK TO PET CARRIERS

(71) Applicant: Sony Corporation, Tokyo (JP)

(72) Inventors: James R. Milne, Ramona, CA (US); Gregory Peter Carlsson, Santee, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 14/333,006

(22) Filed: Jul. 16, 2014

(65) Prior Publication Data
US 2016/0021493 A1 Jan. 21, 2016

(51) Int. Cl.
*H04W 4/02* (2018.01)
*H04W 4/00* (2018.01)
*A01K 1/02* (2006.01)
*H04W 84/18* (2009.01)

(52) U.S. Cl.
CPC ............. *H04W 4/02* (2013.01); *A01K 1/0236* (2013.01); *H04W 4/008* (2013.01); *H04W 84/18* (2013.01)

(58) Field of Classification Search
CPC ...... A01K 1/0236; A01K 1/033; A01K 1/034; A01K 1/035; A01K 1/03; A01K 1/0245; A01K 27/009; A01K 29/005; G08B 17/00; G08B 23/00; G08B 21/0277; H04W 4/02; H04W 4/008
USPC ..... 340/539.1, 539.13, 573.1, 573.3, 539.11; 119/77.2, 163, 496, 501, 719, 720, 481, 119/497
See application file for complete search history.

(56) References Cited

U.S. PATENT DOCUMENTS

| | | | |
|---|---|---|---|
| 3,985,357 A | 10/1976 | Miller | |
| 4,123,511 A | 10/1978 | Heintze | |
| 4,301,207 A | 11/1981 | Schomerus | |
| 4,340,053 A | 7/1982 | Sarui | |
| 4,463,949 A | 8/1984 | McCoy, Sr. et al. | |
| 4,625,336 A | 12/1986 | Derderian | |
| 4,962,935 A | 10/1990 | Williams | |
| 4,992,003 A | 2/1991 | Perach | |
| 5,154,266 A | 10/1992 | Bieber et al. | |
| 5,201,075 A | 4/1993 | Svetich | |
| 5,219,316 A | 6/1993 | Huffman | |

(Continued)

FOREIGN PATENT DOCUMENTS

| CN | 101783931 A | 7/2010 |
|---|---|---|
| JP | 2004233269 | 8/2004 |

(Continued)

OTHER PUBLICATIONS

Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.

(Continued)

*Primary Examiner* — Hung T Nguyen
(74) *Attorney, Agent, or Firm* — John L. Rogitz

(57) ABSTRACT

Mesh node modules are associated with pet carriers and companion nodes can dynamically form a mesh network which uploads location information of the nodes and in some cases additional information, e.g., temperature or pet physical parameter signals, to a network. The information may be downloaded to an owner's CE device.

7 Claims, 3 Drawing Sheets

(56) References Cited

U.S. PATENT DOCUMENTS

| | | | |
|---|---|---|---|
| 5,413,328 A | 5/1995 | Glancey et al. | |
| 5,639,243 A | 6/1997 | Ryan et al. | |
| 5,742,521 A | 4/1998 | Ellenby et al. | |
| 5,755,405 A | 5/1998 | Socha et al. | |
| 5,927,233 A * | 7/1999 | Mainini | A01K 15/022 |
| | | | 119/718 |
| 6,401,250 B1 | 6/2002 | McNabb | |
| 6,438,755 B1 | 8/2002 | MacDonald et al. | |
| 6,588,840 B1 | 7/2003 | Lombardo | |
| 6,742,636 B2 | 6/2004 | Godshaw | |
| 6,810,831 B1 | 11/2004 | Opfel | |
| 6,816,460 B1 | 11/2004 | Ahmed et al. | |
| 6,910,447 B1 * | 6/2005 | Azarian | A01K 15/021 |
| | | | 119/719 |
| 7,323,981 B2 * | 1/2008 | Peel | G07C 5/008 |
| | | | 340/539.1 |
| 7,328,671 B2 * | 2/2008 | Kates | A01K 15/02 |
| | | | 119/719 |
| 7,416,123 B2 | 8/2008 | Saperstein et al. | |
| 7,438,356 B2 | 10/2008 | Howman et al. | |
| 7,451,927 B2 | 11/2008 | Saperstein et al. | |
| 7,626,966 B1 * | 12/2009 | Ruiter | H04M 1/725 |
| | | | 370/310 |
| 7,714,706 B2 | 5/2010 | Brackmann et al. | |
| 7,753,826 B1 | 7/2010 | Oliver et al. | |
| 7,770,539 B1 | 8/2010 | Zimmerman et al. | |
| 7,818,820 B2 | 10/2010 | Tsujimoto | |
| 7,916,025 B2 | 3/2011 | Locker et al. | |
| 8,149,748 B2 | 4/2012 | Bata et al. | |
| 8,253,557 B2 | 8/2012 | Ani et al. | |
| 8,366,570 B1 | 2/2013 | DeMarco et al. | |
| 8,568,191 B2 | 10/2013 | Rehkemper et al. | |
| 8,609,454 B2 | 12/2013 | Dai et al. | |
| 8,624,743 B2 * | 1/2014 | Langer | A01K 15/021 |
| | | | 119/718 |
| 8,878,671 B2 | 11/2014 | Buchheim et al. | |
| 9,167,905 B2 | 10/2015 | Pajic | |
| 9,310,205 B2 | 4/2016 | Xu et al. | |
| 2004/0125493 A1 | 7/2004 | Shimotono et al. | |
| 2004/0141635 A1 | 7/2004 | Liang et al. | |
| 2004/0167367 A1 | 8/2004 | Beierle | |
| 2005/0034083 A1 * | 2/2005 | Jaeger | G06F 3/04847 |
| | | | 715/863 |
| 2005/0259033 A1 | 11/2005 | Levine | |
| 2005/0284405 A1 * | 12/2005 | Pomakoy-Poole | A01K 1/0245 |
| | | | 119/497 |
| 2006/0063540 A1 * | 3/2006 | Beuck | H04W 64/00 |
| | | | 455/456.3 |
| 2006/0080072 A1 | 4/2006 | Lachman et al. | |
| 2006/0154642 A1 | 7/2006 | Scannell, Jr. | |
| 2006/0224300 A1 | 10/2006 | Shioya et al. | |
| 2006/0242901 A1 | 11/2006 | Casimaty et al. | |
| 2007/0130893 A1 | 6/2007 | Davies | |
| 2007/0138272 A1 | 6/2007 | Saperstein et al. | |
| 2007/0138273 A1 | 6/2007 | Saperstein et al. | |
| 2007/0152479 A1 | 7/2007 | Howman et al. | |
| 2007/0243296 A1 | 10/2007 | Bourassa et al. | |
| 2008/0036610 A1 * | 2/2008 | Hokuf | A01K 11/008 |
| | | | 340/539.13 |
| 2008/0120768 A1 | 5/2008 | Tsujimoto | |
| 2008/0173257 A1 * | 7/2008 | Steiner | A01K 27/004 |
| | | | 119/796 |
| 2008/0189170 A1 | 8/2008 | Ramachandra | |
| 2008/0229704 A1 | 9/2008 | Augustyniak et al. | |
| 2009/0040048 A1 | 2/2009 | Locker et al. | |
| 2009/0118869 A1 * | 5/2009 | Cauchy | A01K 1/0245 |
| | | | 700/276 |
| 2009/0203367 A1 | 8/2009 | Pamminger et al. | |
| 2010/0020169 A1 | 1/2010 | Jang et al. | |
| 2010/0119755 A1 | 5/2010 | Chung et al. | |
| 2010/0123778 A1 | 5/2010 | Hada | |
| 2010/0152545 A1 | 6/2010 | Ramsay et al. | |
| 2010/0295687 A1 * | 11/2010 | Kuzniar | G06Q 50/02 |
| | | | 340/573.3 |
| 2011/0005466 A1 * | 1/2011 | Furth | A01K 1/0236 |
| | | | 119/496 |
| 2011/0068906 A1 | 3/2011 | Shafer et al. | |
| 2011/0068922 A1 | 3/2011 | Ross | |
| 2011/0270712 A1 | 11/2011 | Wood et al. | |
| 2012/0069051 A1 | 3/2012 | Hagbi et al. | |
| 2012/0099800 A1 | 4/2012 | Llano et al. | |
| 2012/0158297 A1 | 6/2012 | Kim et al. | |
| 2013/0027561 A1 | 1/2013 | Lee et al. | |
| 2013/0056929 A1 | 3/2013 | Rehkemper et al. | |
| 2013/0063304 A1 | 3/2013 | Almohsen et al. | |
| 2013/0068942 A1 | 3/2013 | Verenchikov | |
| 2013/0093220 A1 | 4/2013 | Pajic | |
| 2013/0132434 A1 | 5/2013 | Scofield et al. | |
| 2013/0141251 A1 | 6/2013 | Sims et al. | |
| 2013/0292976 A1 | 11/2013 | Kane | |
| 2014/0023060 A1 * | 1/2014 | Apte | H04W 84/22 |
| | | | 370/338 |
| 2014/0025805 A1 | 1/2014 | Apte et al. | |
| 2014/0046802 A1 | 2/2014 | Hosein et al. | |
| 2014/0058866 A1 | 2/2014 | Okadome | |
| 2014/0104046 A1 | 4/2014 | Howell | |
| 2014/0118635 A1 | 5/2014 | Yang | |
| 2014/0173439 A1 | 6/2014 | Gutierrez et al. | |
| 2014/0179463 A1 | 6/2014 | Giles et al. | |
| 2015/0039458 A1 | 2/2015 | Reid | |
| 2015/0348413 A1 | 12/2015 | Han et al. | |
| 2015/0382144 A1 | 12/2015 | Lopez | |
| 2016/0019515 A1 | 1/2016 | Milne et al. | |
| 2016/0019788 A1 | 1/2016 | Milne et al. | |
| 2016/0021491 A1 | 1/2016 | Milne et al. | |
| 2016/0021492 A1 | 1/2016 | Carlsson et al. | |
| 2016/0021493 A1 | 1/2016 | Milne et al. | |
| 2016/0021510 A1 | 1/2016 | Milne et al. | |
| 2016/0048861 A1 | 2/2016 | Morgaine | |

FOREIGN PATENT DOCUMENTS

| | | |
|---|---|---|
| JP | 2005017465 | 1/2005 |
| JP | 2006279859 | 10/2006 |
| JP | 2013168883 | 8/2013 |
| TW | I314438 | 9/2009 |
| TW | 201221051 | 6/2012 |

OTHER PUBLICATIONS

Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.

The Seventh ACM International Workshop on Vehicular Inter-NETworking (VANET 2010) in conjunction with ACM MobiCom 2010. Sep. 24, 2010.

Tao Zhang, Xian Chen, Russell Hsing, K. Dnaiel Wong,"VNTA sub-TC" IEEE Communications Society, printed from web Jun. 3, 2014, http://www.danielwireless.com/vnta/.

Reza Azimi, Gaurav Bhatia, Ragunathan (Raj) Rajkumar, Priyantha Mudalige, "Vehicular Networks for Collision Avoidance at Intersections" Society for Automotive Engineers (SAE) World Congress, Apr. 2011, Detroit, MI, USA.

Timo Kosch, Christian Adler, Stephan Eichler, Christopher Schroth, Markus Strassberger, "The Scalability problem of vehicular ad hoc networks and how to solve it", IEEE Wireless Communications Magazine 13, Oct. 2006, No. 5, S.6. http://www.alexandria.unisg.ch/Publikationen/30977.

Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.

Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).

(56) References Cited

OTHER PUBLICATIONS

J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.
Charles McCoy, James R. Milne, True Xiong, "Portable Device to Portable Drive Wireless Power Transfer Methods Systems" file history of related pending U.S. Appl. No. 14/290,409, filed May 29, 2014.
James R. Milne, Charles McCoy, True Xiong, "Scalable Antenna System" file history of related pending U.S. Appl. No. 14/290,426, filed May 29, 2014.
Charles McCoy, James R. Milne, True Xiong, "Method and System for Use in Configuring Multiple Near Field Antenna Systems" file history of related pending U.S. Appl. No. 14/460,224, filed Aug. 14, 2014.
James R. Milne, Gregory Peter Carlsson, Frederick J. Zustak, "Applying Mesh Network to Luggage", reiated pending U.S. Appl. No. 14/332,919, non-final office action dated Jan. 20, 2016.
James R. Milne, Gregory Peter Carlsson, Frederick J. Zustak, "Applying Mesh Network to Luggage", related pending U.S. Appl. No. 14/332,919, filed Jul. 16, 2014.
James R. Milne, Gregory Peter Carlsson, Frederick J. Zustak, "Applying Mesh Network to Stadium Services", related pending U.S. Appl. No. 14/332,849, filed Jul. 16, 2014.
James R. Milne, Gregory Peter Carlsson, Frederick J. Zustak, "Vehicle Ad Hoc Network (VANET)", related pending U.S. Appl. No. 14/332,900, filed Jul. 16, 2014.
James R. Milne, Gregory Peter Carlsson, Frederick J. Zustak, "Mesh Network Applied to Fixed Establishment with Movable Items Therein", related pending U.S. Appl. No. 14/332,836, filed Jul. 16, 2014.
Gregory Peter Carlsson, Frederick J. Zustak, James R. Milne,"Mesh Network Applied to Arena Events", related pending U.S. Appl. No. 4/332,953, filed Jul. 16, 2014.
James R. Milne, Gregory Peter Carlsson, Frederick J. Zustak, "Applying Mesh Network to Luggage", related U.S. Appl. No. 14/332,919, Applicant's response to Non-Final Office Action filed Feb. 11, 2016.
James R. Milne, Gregory Peter Calrsson, Frederick J. Zustak, "Vehicle Ad Hoc Network (VANET)", related U.S. Appl. No. 14/332,900, Non-Final Office Action dated Jan. 14, 2016.
James R. Milne, Gregory Peter Calrsson, Frederick J. Zustak, "Vehicle Ad Hoc Network (VANET)", related U.S. Appl. No. 14/332,900, Applicant's response to Non-Final Office Action filed Jan. 15, 2016.
James R. Milne, Gregory Peter Carlsson, Frederick J. Zustak, "Mesh Network Applied to Fixed Establishment with Movable Items Therein", related U.S. Appl. No. 14/332,836, Final Office Action dated Oct. 31, 2016.
James R. Milne, Gregory Peter Carlsson, Frederick J. Zustak, "Mesh Network Applied to Fixed Establishment with Movable Items Therein", related U.S. Appl. No. 14/332,836, Applicant's response to Final Office Action filed Nov. 15, 2016.
James R. Milne, Gregory Peter Carlsson, Frederick J. Zustak, "Mesh Network Applied to Fixed Establishment with Movable Items Therein", related pending U.S. Appl. No. 14/332,836, non-final office action dated Mar. 22, 2017.
James R. Milne, Gregory Peter Carlsson, Frederick J. Zustak, "Mesh Network Applied to Fixed Establishment with Movable Items Therein", related pending U.S. Appl. No. 14/332,836, applicant's response to non-final office action filed Mar. 27, 2017.
James R. Milne, Gregory Peter Carlsson, Frederick J. Zustak, "Applying Mesh Network to Stadium Services", related pending U.S. Appl. No. 14/332,849, Non-Final Office Action dated Jun. 19, 2017.
James R. Milne, Gregory Peter Carlsson, Frederick J. Zustak, "Applying Mesh Network to Stadium Services", related pending U.S. Appl. No. 14/332,849, applicant's response to non-final office action filed Jul. 17, 2017.
James R. Milne, Gregory Peter Carlsson, Frederick J. Zustak, "Mesh Network Applied to Fixes Establishment with Movable Items Therein", related pending U.S. Appl. No. 14/332,836, Final Office Action dated Jun. 21, 2017.
James R. Milne, Gregory Peter Carlsson, Frederick J. Zustak, "Mesh Network Applied to Fixes Establishment with Movable Items Therein", related pending U.S. Appl. No. 14/332,836, applicant's response to final office action filed Jul. 17, 2017.
James R. Milne, Gregory Peter Carlsson, Frederick J. Zustak, "Vehicle Ad Hoc Network (VANET)", related pending U.S. Appl. No. 15/149,562, filed May 9, 2016.
Shiro Sakata, "Technical Paper, Chapter 2 Ad-Hoc Network, fifth title mobile IP Ad-Hoc Network, fourth group mobile/wirelss, knowledge base, knowledge forest" Institute of Electronics, Information and Communication Engineers, Jun. 10, 2010 URL link http://www.ieice-hbkb.org/files/04/04gun_05hen_02.pdf.
James R. Milne, Gregory Peter Carlsson, Frederick J. Zustak, "Applying Mesh Network to Luggage", related U.S. Appl. No. 14/332,919, Final Office Action dated Jun. 3, 2016.
James R. Milne, Gregory Peter Carlsson, Frederick J. Zustak, "Applying Mesh Network to Luggage", related U.S. Appl. No. 14/332,919, Applicant's response to Final Office Action filed Jun. 14, 2016.
Gregory Peter Carlsson, Frederick J. Zustak, James R. Milne, "Mesh Network Applied to Arena Events", related U.S. Appl. No. 14/332,953, Non-Final Office Action dated Jun. 30, 2016.
Gregory Peter Carlsson, Frederick J. Zustak, James R. Milne, "Mesh Network Applied to Arena Events", related U.S. Appl. No. 14/332,953, Applicant's response to Non-Final Office Action filed Jun. 30, 2016.
James R. Milne, Gregory Peter Carlsson, Frederick J. Zustak, "Mesh Network Applied to Fixed Establishment with Movable Items Therein", related pending U.S. Appl. No. 14/332,836 non-final office action dated Jul. 25, 2016.
James R. Milne, Gregory Peter Carlsson, Frederick J. Zustak, "Mesh Network Applied to Fixed Establishment With Movable Items Therein", related U.S. Appl. No. 14/332,836, Applicant's response to Non-Final Office Action filed Aug. 19, 2016.

* cited by examiner

APPLYING MESH NETWORK TO PET CARRIERS

I. FIELD OF THE INVENTION

The application relates generally to applying mesh networks to pet carriers such as kennels.

II. BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p, IEEE 802.11s, WAVE IEEE 1609, WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to monitor pets in carriers such as portable kennels.

SUMMARY OF THE INVENTION

In the case of pet carriers, there is no current solution to knowing where the kennel is if in transit or how the pet is doing other than by accessing video of the pet via an IP address or talking to a person at the kennel via the phone.

Accordingly, an apparatus includes a pet carrier defining an enclosure openable to load and unload an animal into the enclosure and closable to maintain the animal securely within the enclosure. The enclosure has one or more ventilation openings into the enclosure when the enclosure is closed. A location sensor is engaged with the pet carrier, and a wireless transmitter is supported by the pet carrier. The apparatus includes a computer readable storage medium bearing instructions executable by a processor, and a processor supported by the pet carrier and configured to receive signals from the location sensor. The processor is configured for accessing the computer readable storage medium to execute the instructions to configure the processor to upload to a network, via the wireless transmitter, location signals according to signals received from the location sensor.

In some examples, a shock sensor is supported by the pet carrier and is configured to send signals to the processor, with the instructions when executed by the processor configuring the processor to upload signals to the network via the transmitter representing shock to the pet carrier as indicated by the signals from the shock sensor.

The network can include an ad hoc mesh network. The network can include the Internet.

In example implementations, the instructions when executed by the processor configure the processor to determine, using information from the transmitter, whether communication with the network through at least one network access point is available, and responsive to a determination that communication with the network through at least one network access point is available, automatically send at least one of the location signals to the network. The instructions when executed by the processor may configure the processor to, responsive to a determination that communication with the network through at least one network access point is available, automatically send a sequence of locations signals to the network.

Furthermore, in some implementations the instructions when executed by the processor configure the processor to receive at least one pet signal representing a physical parameter of a pet within the pet carrier, and/or receive at least one environmental signal representing at least one environmental parameter within the pet carrier. The processor uploads the pet signal and/or environmental signal to the network.

In another aspect, a consumer electronics (CE) device includes a display, a wireless transceiver, and a computer readable storage medium bearing instructions executable by a processor. A processor is configured for accessing the computer readable storage medium to execute the instructions to configure the processor to receive information through the transceiver from at least one pet carrier, and to present the information on the display.

In some embodiments the instructions when executed by the processor may configure the processor to present on the display a first message indicating a temperature of the pet carrier. Also, the instructions when executed by the processor may configure the processor to present on the display a first message indicating a physical parameter of a pet in the pet carrier. Further, the instructions when executed by the processor may configure the processor to receive shock information through the transceiver from the pet carrier, and present on the display a message derived from the shock information. The physical parameter can be heart rate and/or an indication of noise from the pet.

In another aspect, a mesh network includes plural computerized node modules associated with respective pet carriers and dynamically forming a mesh network which uploads information related to the pet carriers to a receiving network for downloading of the information to a consumer electronics (CE) device.

The details of the present invention, both as to its structure and operation, can be best understood in reference to the accompanying drawings, in which like reference numerals refer to like parts, and in which:

DETAILED DESCRIPTION

Figure 1:
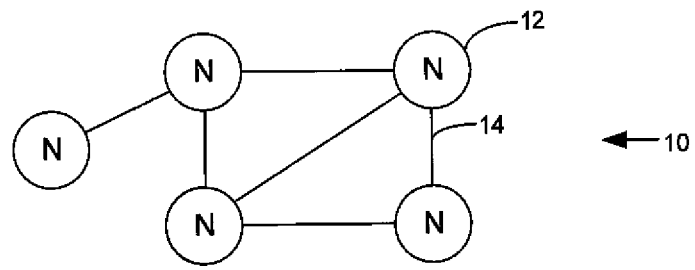
FIG. 1 is a block diagram of an example system including an example in accordance with present principles.

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the node 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component, so that a network map or other network information user interface (UI) may be presented showing the mesh nodes along with an identification of the components, and not just the MAC addresses, with which the nodes are associated.

Figure 2:
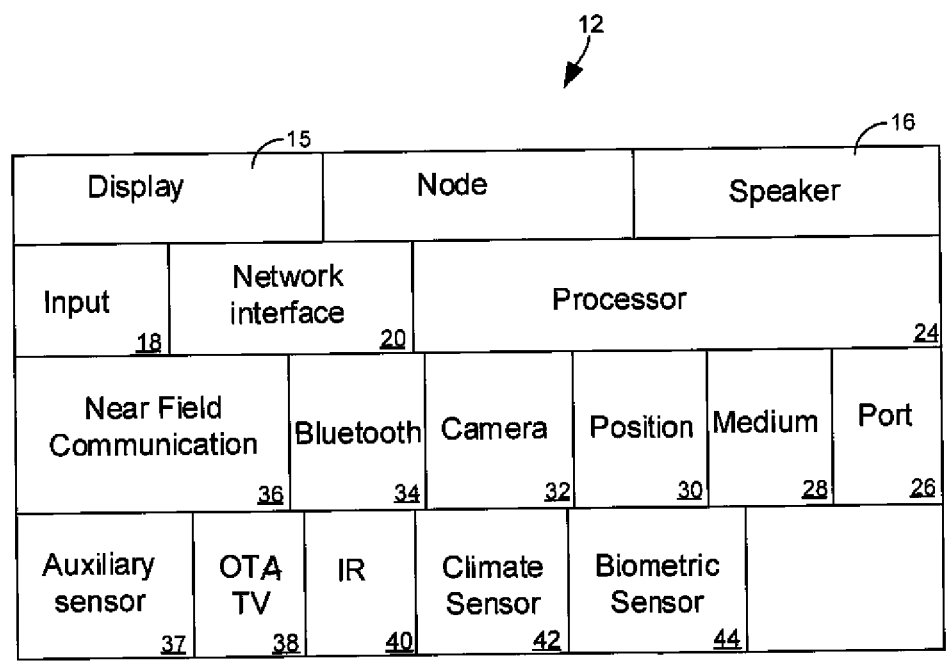
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HDMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the NODE 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
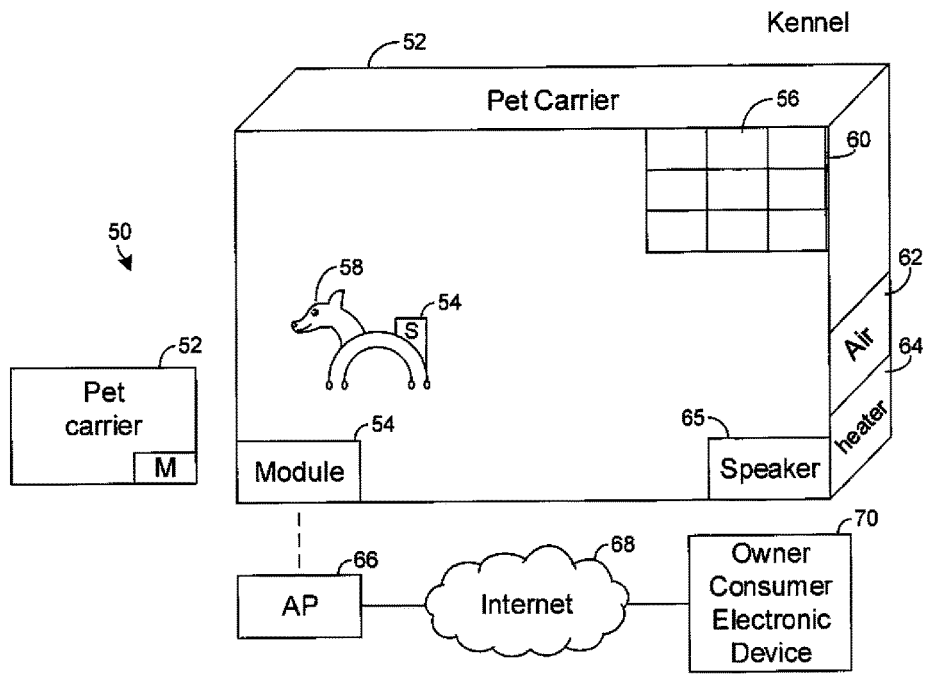
FIG. 3 is a schematic diagram of a pet carrier MANET.

FIG. 3 shows an example mesh network 50 in which one or more pet carriers 52 are associated with respective nodal modules 54 each of which may be implemented by the appropriate components of the example node in FIG. 2. By "pet carrier" is meant the plain and ordinary meaning of the term, to wit: kennels and other carriers suitable for transporting live pets in, typically including ventilation openings 56 into the interior of the pet carrier when the carrier is closed to contain the pet 58, which as shown may internally or externally bear its own node module 54. In the non-limiting example shown, a pet can enter and exit the pet carrier through a ventilated door which opens and closes on a hinge 60. The pet carrier may be equipped with an air conditioner 62 and heater 64 to control the temperature of the interior of the carrier for the pet's comfort. One or more audio speakers 65 may also be provided on the carrier. The A/C/ 62, heater 64, and speaker 65 may be in communication with the processor of the pet carrier module 54 for control thereby.

The modules 54 communicate with each other according to mesh network principles mentioned previously, and when a pet carrier 52 is sufficiently close to a network access point (AP) 66, mesh network 50 node and link information may be uploaded to a network such as the Internet 68 for provision of the network information to a CE device 70, typically associated with the owner of the pet carrier 52. The CE device 70 may be implemented by some or all of the components shown in FIG. 2 for a network node. Preferably, many APs are provided so that the mesh network can frequently communicate with the Internet.

It is to be understood that the CE device 70 may be registered by an Internet server to be associated with the pet carrier 52. In an example non-limiting embodiment, the owner of the CE device 70 may co-locate the device 70 and the pet carrier 52 prior to travel in an initial mesh, with the nodes exchanging information and with the CE device recording the MAC addresses and/or recording or establishing (using user input) component names (e.g., "kennel 1, kennel 2, Pet Name 1, . . . "). The CE device 70 may download a tracking application from the Internet for this purpose, and then upload, using the application, the identity of the pet carriers associated with the CE device, along with the CE device network address. In this way, an Internet server subsequently receiving information pertaining to the MAC address or other identification of the pet carrier(s) can download the information to the CE device executing the tracking application.

Figure 4:
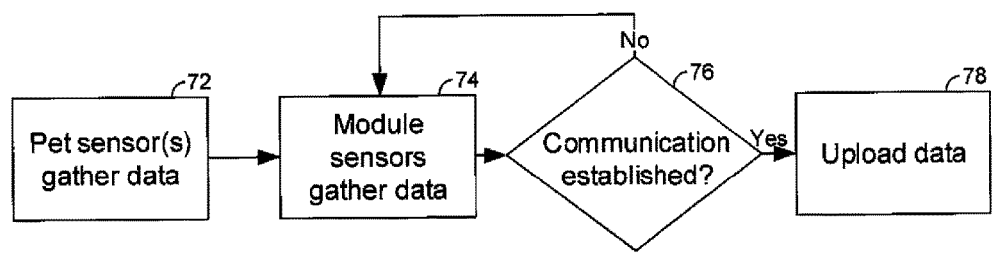
FIG. 4 is a flow chart of example non-limiting logic.

FIG. 4 illustrates example logic. At block 72 each node module 54 on a pet 58 stores signals from its various sensors. These sensors may include, without limitation, pulse (hear rate) sensors, temperature sensors, blood pressure sensors, microphones (for sensing barking), location sensors such as GPS receivers, shock sensors such as gyroscopes and accelerometers, etc. Likewise, at block 74 the pet carrier modules 54 gather information from their sensors. These sensors may include, without limitation, microphones, temperature sensors, ambient air pressure sensors, humidity sensors, altitude sensors, magnetic field sensors, oxygen sensors, carbon dioxide sensors, location sensors such as GPS receivers, shock sensors such as gyroscopes and accelerometers. When one or more of the module processors determines at decision diamond 76, using information from the module mesh network transmitter, whether communication with the network through an AP is available, the logic moves to block 78 to ping other nodes in the mesh network for their sensor information, if not already obtained by the communicating node, and then the node module in communication with the AP automatically sends the sensor signals to the network.

Figure 5:
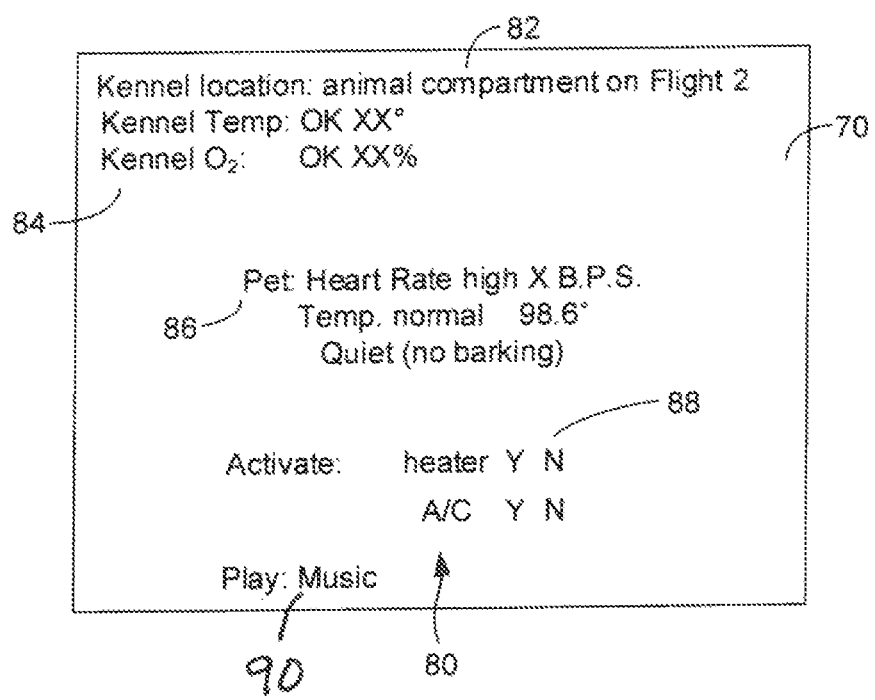
FIG. 5 is a screen shot of an example user interface for the pet owner's CE device.

FIG. 5 shows a user interface (UI) 80 that may be presented on the CE device 70 reflecting sensor information uploaded from the mesh network 50 shown in FIG. 3 and described above. As shown, a location message 82 may be presented on the UI 80 informing the user of the CE device 70 of the location of the pet carrier. In the example shown, an Internet server has correlated a location signal from a pet module 54 and/or from a carrier module 54 to a location of an animal compartment on a particular airplane, listed by flight number in the example shown. This correlation may be established by, for instance, matching the pet/carrier location signal to a currently reported location signal from the aircraft and preferably from the pet compartment of the aircraft, or by matching the pet/carrier location signal with a currently reported location signal of an access point whose fixed location within the aircraft is known. Instead of a text message 82, the message may be in the form of a map showing the location of the pet carrier and of the owner along with various other objects such as a passenger air terminal and the aircraft on which the pet carrier is disposed.

Additionally, message(s) 84 may be presented on the UT 80 indicating environmental conditions in the pet carrier, as uploaded from the module sensors in the mesh network 50. These messages may indicate quantitative measures as shown and, by comparing those quantitative measures to a database on acceptable and unacceptable environmental parameters, qualitative indications as also shown.

As mentioned above, pet sensors may be engaged with, e.g., a module 54 on a pet 58 to sense physiological parameters of the pet, and based on signals from those sensors, pet parameter messages 86 may be presented on the UI 80. As was the case with the environmental messages 84, the physiological messages 86 may indicate quantitative measures as shown and, by comparing those quantitative measures to a database on acceptable and unacceptable physiological parameters, qualitative indications as also shown.

Environmental control selectors 88 may also be provided to command the module processor to activate or deactivate the A/C/ 62 and heater 64 in the pet carrier. Also, a sound control selector 90 may be presented that can be selected to activate the speaker 65 to play music, a recording of the owner's voice, etc. to soothe the pet if, as an example, the microphone signal precipitated a message 86 that the pet is barking excessively.

It will be appreciated that while the APPLYING MESH NETWORK TO PET CARRIER has been fully described in relation to one or more example embodiments, these are not intended to be limiting, and that various alternative arrangements may be used to implement the subject matter claimed herein.

What is claimed is:

1. An apparatus comprising:
    a pet carrier defining an enclosure openable to load and unload an animal into the enclosure and closable to maintain the animal securely within the enclosure, the enclosure having one or more ventilation openings into the enclosure when the enclosure is closed;
    at least one location sensor engaged with the pet carrier;
    at least one wireless transmitter supported by the pet carrier;
    at least one computer readable storage medium bear instructions executable by a processor; and
    at least one processor supported by the pet carrier and configured to receive signals from the location sensor, the processor also being configured for accessing the computer readable storage medium to execute the instructions to configure the processor to:
    determine, using information from the transmitter, whether communication with a network through at least one network access point is available; and
    responsive to a determination that communication with the network through at least one network access point is available, automatically send at least one of the location signals to the network.

2. The apparatus of claim 1, wherein the instructions are executable to receive a wireless command, responsive to user input on a device receiving the location signals, a signal to control at least one environmental control apparatus in the pet carrier; and
    responsive to the wireless command, alter an operating state of the environmental control apparatus.

3. The apparatus of claim 1, wherein the network is an ad hoc mesh network.

4. The apparatus claim 1, wherein the network includes the Internet.

5. The apparatus of claim 1, comprising at least one shock sensor supported by the pet carrier, wherein the instructions when executed by the processor configure the processor to:
    upload signals to the network via the transmitter representing shock to the pet carrier as indicated by the signals from the shock sensor.

6. The apparatus of claim 1, wherein the instructions when executed by the processor configure the processor to, responsive to a determination that communication with the network through at least one network access point is available, automatically send a sequence of location signals to the network.

7. The apparatus of claim 1, wherein the instructions when executed by the processor configure the processor to:
    receive at least one pet signal representing a physical parameter of a pet within the pet carrier, and/or receive at least one environmental signal representing at least one environmental parameter within the pet carrier; and
    upload the pet signal and/or environmental signal to the network.

\* \* \* \* \*